United States Patent
Shebli

(10) Patent No.: US 12,060,959 B2
(45) Date of Patent: Aug. 13, 2024

(54) PIPE SUPPORT

(71) Applicant: AIRBUS OPERATIONS LIMITED, Bristol (GB)

(72) Inventor: Mouayiad Shebli, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/435,323

(22) PCT Filed: Jun. 17, 2020

(86) PCT No.: PCT/EP2020/066733
§ 371 (c)(1),
(2) Date: Aug. 31, 2021

(87) PCT Pub. No.: WO2020/254386
PCT Pub. Date: Dec. 24, 2020

(65) Prior Publication Data
US 2022/0025992 A1    Jan. 27, 2022

(30) Foreign Application Priority Data
Jun. 19, 2019 (GB) .................................... 1908782

(51) Int. Cl.
*F16L 3/10* (2006.01)
*F16L 3/18* (2006.01)
*B64D 47/00* (2006.01)

(52) U.S. Cl.
CPC ............... *F16L 3/1091* (2013.01); *F16L 3/18* (2013.01); *B64D 47/00* (2013.01)

(58) Field of Classification Search
CPC ... F16L 3/1091; F16L 3/18; F16L 5/00; F16L 3/1075; F16L 3/1083; H02G 3/22; H02G 3/26; H02G 3/36; H02G 3/32
(Continued)

(56) References Cited

U.S. PATENT DOCUMENTS 1,784,667 A * 12/1930 Gillet ...................... F16B 21/16
285/415
3,402,945 A * 9/1968 Rittenhouse .......... F16L 27/125
285/368
(Continued)

FOREIGN PATENT DOCUMENTS

CN    203823287 U    9/2014
CN    108027089 A    5/2018
(Continued)

OTHER PUBLICATIONS

International Search Report for PCT/EP2020/066733, mailed Sep. 25, 2020, 3 pages.
(Continued)

*Primary Examiner* — Christopher Garft
(74) *Attorney, Agent, or Firm* — Nixon & Vanderhye P.C.

(57) ABSTRACT

A pipe support block for an aircraft fluid system is disclosed in which the pipe support block is arranged to support a pipe on a structural member, such as a bracket. The pipe support has a first part and a second part which together form a collar. The collar has a pipe receiving bore and is configured to support a fluid pipe on the structural member. First and second fastener holes extend through both the first part and the second part. The first and second fastener holes are each arranged to receive a fastener to fasten the first and second parts to each other and to the structural member.

17 Claims, 4 Drawing Sheets

(58) Field of Classification Search
USPC .......................................................... 248/74.4
See application file for complete search history.

(56) References Cited

U.S. PATENT DOCUMENTS

| | | | | |
|---|---|---|---|---|
| 3,895,833 | A | | 7/1975 | Thiessen |
| 4,023,836 | A | * | 5/1977 | Applehans ............. F16L 23/032 |
| | | | | 285/368 |
| 4,519,639 | A | * | 5/1985 | Florian ............... F01N 13/1805 |
| | | | | 285/415 |
| 5,314,215 | A | * | 5/1994 | Weinhold ............. F16L 23/032 |
| | | | | 285/283 |
| 6,315,335 | B1 | * | 11/2001 | Seedorff ............. F16L 23/0283 |
| | | | | 285/414 |
| 6,460,901 | B2 | * | 10/2002 | Rochelle ............. F16L 19/0231 |
| | | | | 285/415 |
| 7,111,876 | B2 | * | 9/2006 | Hayashi ................ F16L 23/032 |
| | | | | 285/415 |
| 7,534,965 | B1 | * | 5/2009 | Thompson ................ H02G 3/22 |
| | | | | 174/152 G |
| 9,140,003 | B1 | * | 9/2015 | Gretz ...................... E03B 9/025 |
| 9,689,518 | B2 | * | 6/2017 | Gayer ................. F16L 23/0283 |
| 2006/0071475 | A1 | | 4/2006 | James et al. |
| 2007/0199728 | A1 | * | 8/2007 | Hedstrom ................ F16L 5/08 |
| | | | | 174/50.5 |
| 2013/0048826 | A1 | | 2/2013 | Go |
| 2013/0187013 | A1 | | 7/2013 | Minami |
| 2020/0055611 | A1 | * | 2/2020 | Walters ................. H01B 17/38 |

FOREIGN PATENT DOCUMENTS

| | | |
|---|---|---|
| EP | 1 512 899 | 3/2005 |
| EP | 3 438 001 | 2/2019 |
| GB | 566292 | 12/1944 |
| GB | 2571826 | 9/2019 |
| JP | 2016114216 A | 6/2016 |

OTHER PUBLICATIONS

Written Opinion of the ISA for PCT/EP2020/066733, mailed Sep. 25, 2020, 8 pages.
Combined Search and Examination Report for GB1908782.4, Nov. 26, 2019, 6 pages.
CNIPA Notification of Intention to Grant Patent for Invention and English Translation for Application No. 202080018746.9, seven pages, dated Apr. 19, 2024.

* cited by examiner

PIPE SUPPORT

CROSS REFERENCE TO RELATED APPLICATIONS

The present application is a National Phase of International Application Number PCT/EP2020/066733 filed Jun. 17, 2020, which designated the U.S. and claims priority benefits from Great Britain Application Number GB 1908782.4 filed Jun. 19, 2019, the entire contents of each of which are hereby incorporated by reference.

FIELD OF THE INVENTION

The present invention relates to a pipe support, a pipe mounting assembly, a pipe assembly, a fixed wing aircraft, and a method of assembling a pipe with an aircraft structural member.

BACKGROUND OF THE INVENTION

Aircraft wing boxes are provided with hydraulic pipes and other fluid conduits, that extend through openings in structural members, such as ribs and brackets.

To mount such pipes in place at the structural members it is known to use supports such as pipe clips and mounting blocks. Such supports are typically positioned over the opening in the structural member through which the pipe extends and are clamped on the pipe. The supports are subsequently fastened to the structural member by fasteners, such as nuts and bolts, to hold the pipe in position. Such a configuration leads to a complicated assembly, which leads to a time consuming and inefficient assembly process.

SUMMARY OF THE INVENTION

According to an aspect of the present invention, there is provided a pipe support for an aircraft fluid system, the pipe support comprising: a first part and a second part which together form a collar with a pipe receiving bore configured to support a fluid pipe on a structural member; a first fastener hole extending through both the first part and the second part; and a second fastener hole extending through both the first part and the second part, wherein the first and second fastener holes are each arranged to receive a fastener to fasten the first and second parts to each other and to the structural member.

With such a configuration, it is possible to mount the first and second parts to each other and to the structural member using the same fasteners. As such the number of fasteners may be minimised. Assembly is simplified by clamping the components together using the same fasteners. Clamping of the pipe and fixing to the structural member may occur simultaneously.

Axes of the first and second fastener holes may extend parallel to an axis of the pipe receiving bore. As such, combined fixation and clamping of the support and pipe may be achieved.

The first part may have a first abutment face and the second part may have a second abutment face, the first and second abutment faces being configured to abut to form the collar.

A first bore recess may be formed in the first abutment face and a second bore recess may be formed in the second abutment face, the first and second bore recesses together forming the pipe receiving bore.

The first and second abutment faces may be inclined relative to the axis of the pipe receiving bore.

With such an arrangement it is possible to ensure that the first and second parts are orientated correctly with respect to each other. The incline ensures that portions of each hole will be misaligned between the two parts should one of the parts be reversed, and so prevents incorrect assembly.

The first part and the second part may each comprise a first overlapping portion which are arranged to overlap to define the first fastener hole; and wherein the first part and the second part may each comprise a second overlapping portion which are arranged to overlap to define the second fastener hole.

As such, the fastener holes may be straightforwardly formed by the two parts.

Failure redundancy is aided by the first and second fasteners both extending through both of the first and second parts.

The first part may have a first clamping face, and the second part may have a second clamping face, wherein the first and second clamping faces clamp against each other when the first and second parts are brought together in an axial direction of the first and second fastener holes.

By clamping the first and second parts in the axial direction, the parts are easily mounted to the structural member.

The first part may have at least two first clamping faces on one side of the first part, and the second part may have at least two second clamping faces on one side of the second part.

The pipe support may comprise a stop offset from axes of both the first and second fastener holes to prevent rotation of one of the first and second parts relative to the other of the first and second parts about either of the axes of the first and second fastener holes.

As such, the stop restricts rotation on one of the parts relative to the other part in a situation in which one of the fasteners is omitted.

The stop may comprise a male stop feature protruding axially from one of the first and second parts and a female stop feature on the other one of the first and second parts arranged to receive the male stop feature when the first and second parts are brought together in an axial direction of the first and second fastener holes.

One of the first and second parts may be interchangeable with another of either of the first and second parts. As such, another first or second part may be interchanged with another of the first and second parts to form the pipe support. The ability to replace parts is therefore enhanced.

The first and second parts may be at least substantially identical. As such, manufacture of the pipe support is simplified.

The pipe support may be a pipe support block.

The pipe support may comprise a first fastener configured to extend through the first fastener hole of the first part and the second part to clamp the first and second parts with each other and the structural member; and a second fastener configured to extend through the second fastener hole of the first part and the second part to clamp the first and second parts with each other and the structural member.

According to an aspect of the present invention, there is provided a pipe mounting assembly for an aircraft fluid system comprising: a pipe support configured to support a pipe on a structural member, the pipe support having a first part and a second part which together form a collar around the pipe; a first fastener configured to extend through both the first part and second part to fasten the first and second parts to each other and to the structural member; and a second fastener configured to extend through both the first part and second part to fasten the first and second parts to each other and to the structural member.

According to an aspect of the present invention, there is provided a pipe assembly for an aircraft fluid system comprising: an aircraft structural member; a fluid pipe extending through an opening in the aircraft structural member; a pipe support collar supporting the fluid pipe; and a first fastener and a second fastener fastening the collar to the aircraft structural member; wherein the pipe support collar includes a first part and a second part which together encircle the fluid pipe; and wherein the first fastener and the second fastener each extend through both the first part and the second part to fasten the first and second parts to each other.

The fluid pipe may be slidably retained by the pipe support collar.

The pipe may be a hydraulic pipe.

The structural member may be one of a rib and a support bracket.

According to an aspect of the present invention, there is provided a fixed wing aircraft comprising at least one of the pipe support according to an aspect as described above, the pipe mounting assembly according to an aspect as described above, and the pipe assembly according to an aspect as described above.

According to an aspect of the present invention, there is provided a method of supporting a pipe on a structural member of an aircraft, the method comprising: disposing a pipe through an opening in the structural member; locating first and second parts of a pipe support together on the pipe to form a collar; inserting a first fastener through both the first and second parts of the pipe support and fastening the first fastener with the structural member; and inserting a second fastener through both the first and second parts of the pipe support and fastening the second fastener with the structural member.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
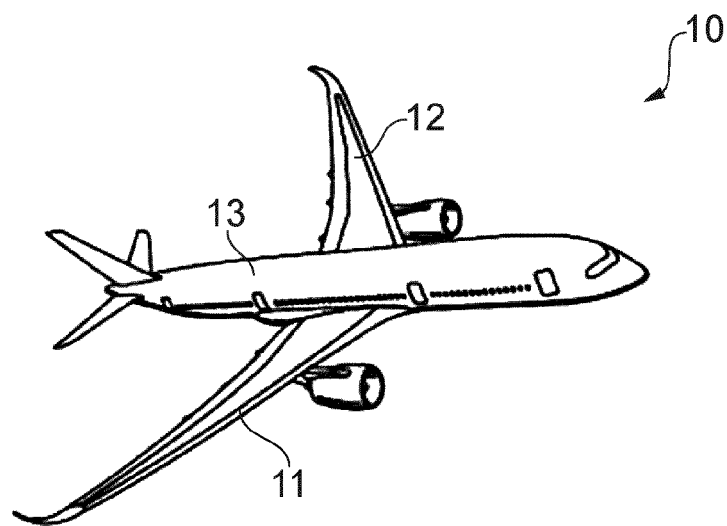
FIG. 1 is a perspective view of an aircraft.

FIG. 1 shows an existing aircraft 10 with starboard and port fixed wings 11, 12, and a fuselage 13. The aircraft 10 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing has a cantilevered structure with a length extending in a span-wise direction from a root to a tip, the root being joined to the aircraft fuselage 13. The wings 11, 12 are similar in construction so only the starboard wing 11 will be described in detail below.

Figure 2:
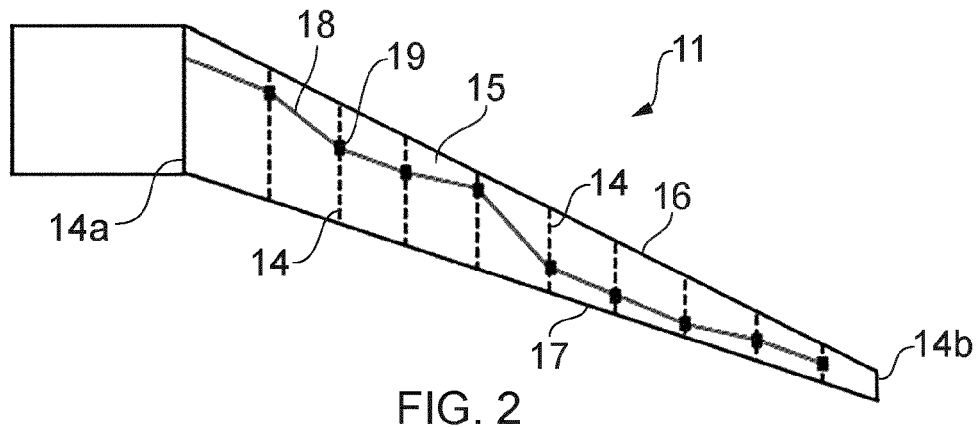
FIG. 2 is a plan view of a hydraulic fluid line on a starboard wing.

As shown schematically in FIG. 2, the wing 11 includes a series of spaced ribs 14 between an inboard rib 14a and an outboard rib 14b at the starboard wing tip. Each rib 14 defines a rib plane. The rib plane of each rib extends substantially parallel to the or each adjacent rib plane. The orientation of adjacent ribs with respect to each other may vary. The rib plane extends substantially parallel to a chord axis of the wing 3. The ribs 14 form part of a wing box 15, the wing box 15 also including front and rear spars 16, 17, upper and lower covers, and other components such as stringers.

Pipes acting as fluid lines, for example hydraulic fluid lines, vent lines and fuel lines, extend through aircraft structures, such as the wing box 15. One such pipe 18, a hydraulic pipe, is shown in FIG. 2. The pipe 18 extends across multiple ribs 14. The pipe 18 extends through openings in the ribs 14. Pipe support blocks 19 are mounted to each rib, or to an adjacent support bracket, and are configured to hold the pipe 18 in place.

Figure 3:
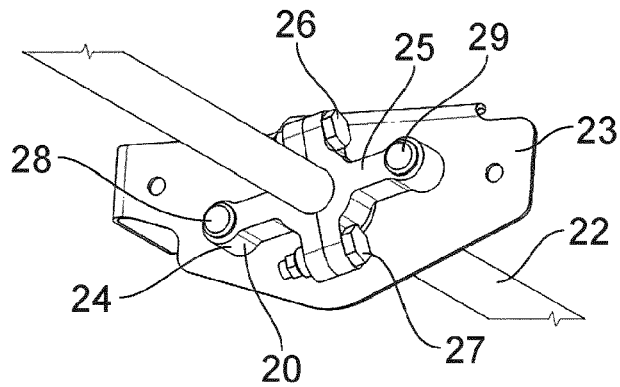
FIG. 3 is a perspective view of a fluid pipe of an existing aircraft fluid system supported on a bracket by an existing pipe support block.

One typical existing configuration is shown in FIG. 3. A pipe support 20 mounts a pipe 22 to a support bracket 23. The support bracket 23 extends between adjacent stringers (not shown). The pipe support 20 includes first and second collar portions 24, 25. The collar portions 24, 25 form a collar around the pipe 22. The first and second collar portions 24, 25 are clamped to each other around the pipe 22 by a first pair of fasteners 26, 27. The first and second collar portions 24, 25 are clamped to the bracket 23 by a second pair of fasteners 28, 29.

Figure 4:
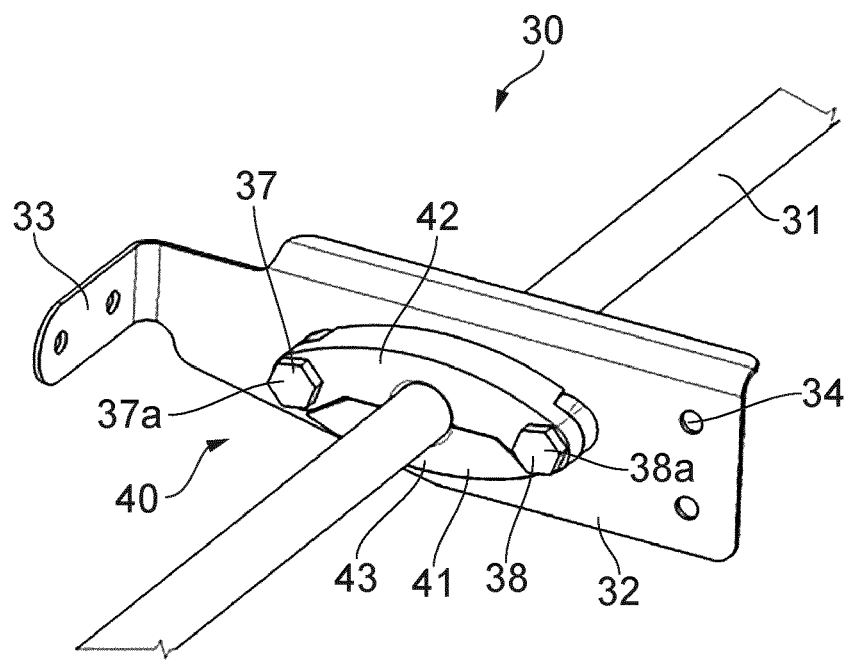
FIG. 4 is a front perspective view of a fluid pipe supported on a bracket by a pipe support block of a pipe mounting assembly.
Figure 5:
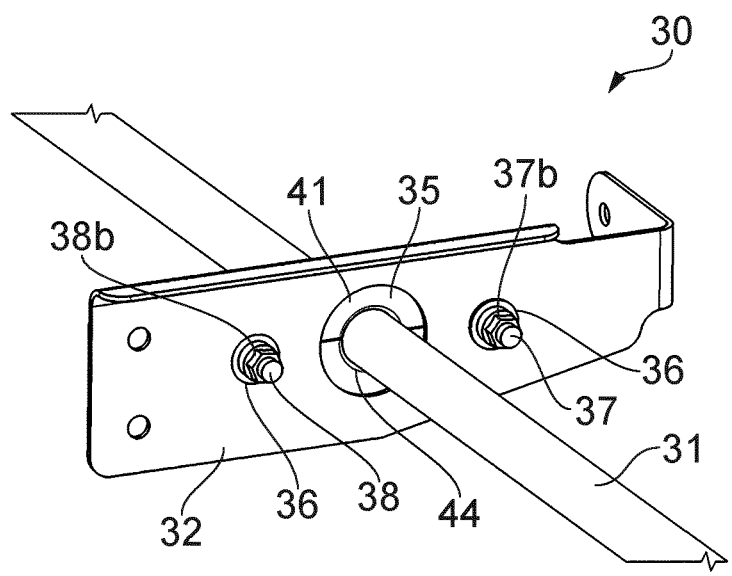
FIG. 5 is a rear perspective view of the fluid pipe supported on a bracket by a pipe support block.
Figure 6:
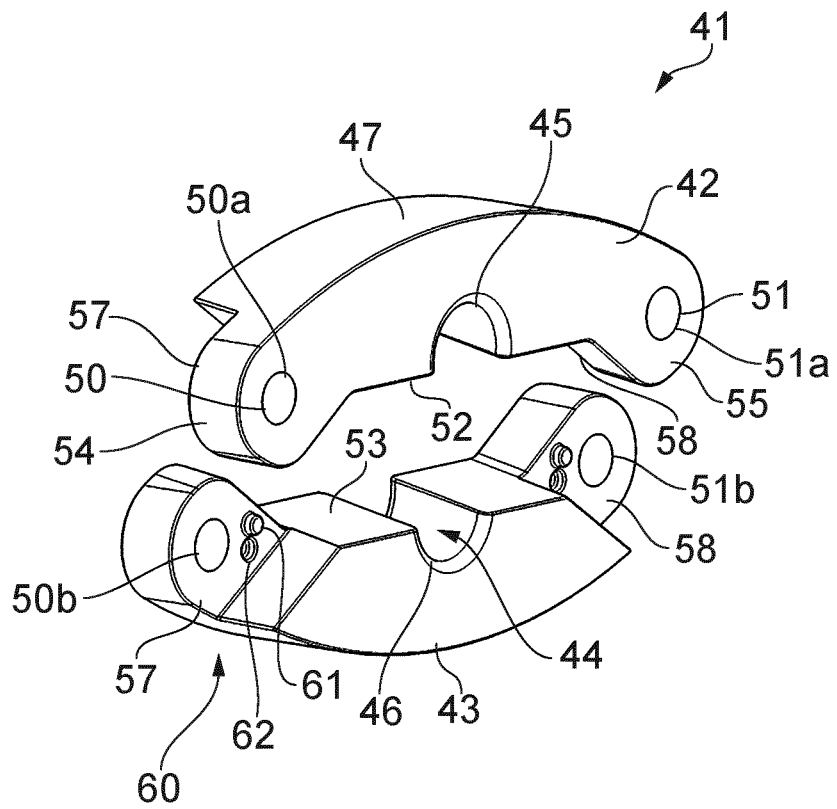
FIG. 6 is an exploded perspective view of the pipe support block of FIG. 5.
Figure 7:
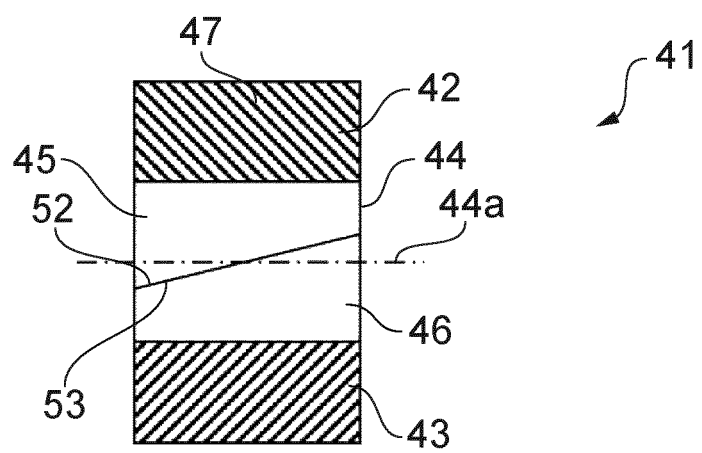
FIG. 7 is a side cross-sectional view of the pipe support block of FIG. 5.
Figure 8:
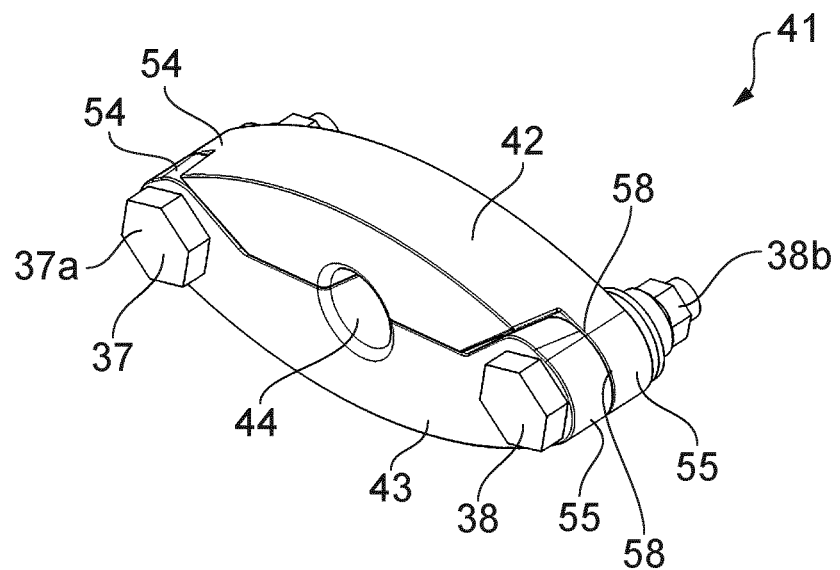
FIG. 8 is a front perspective view of the pipe mounting assembly including the pipe support block and fasteners.
Figure 9:
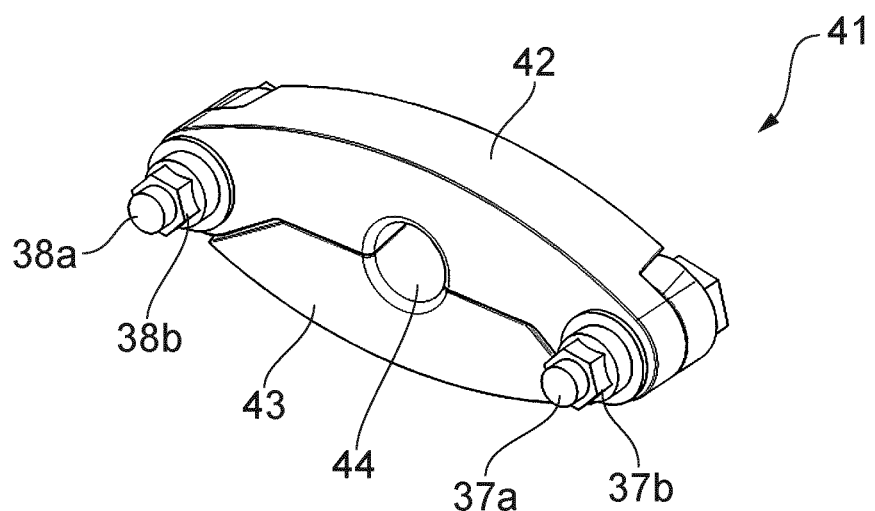
FIG. 9 is a front perspective view of the pipe mounting assembly including the pipe support block and fasteners.

FIGS. 4 and 5 shows a pipe assembly 30 in accordance with an embodiment of the invention. The pipe assembly 30 forms part of an aircraft assembly. The pipe assembly 30 includes a pipe 31, a support bracket 32 and a pipe mounting assembly 40. The pipe assembly 30 may comprise a plurality of pipe mounting assemblies 40 mounting the pipe 31 to a plurality of corresponding support brackets 32. The support bracket 32 acts as a structural member. The pipe mounting assemblies 40 may be mounted to other components acting as structural members, such as ribs, spars, and plates.

The pipe 31 extends in the aircraft assembly. The pipe 31 forms part of an aircraft system, for example in this case an hydraulic system. The pipe 31 may form part of an alternative system. The support bracket 32 acts as a structural member, and is mounted to other structural components, such as stringers, by mounting flange 33 and mounting holes 34. Other mounting means may be used. The pipe 31 extends through an opening 35 in the support bracket 32. The opening 35 is sized to receive the pipe 31. The opening 35 has a diameter greater than the outer diameter of the pipe 31. The pipe 31 is moveable in the opening 35. Mounting apertures 36 are formed in the support bracket 32. The mounting apertures 36 receive fasteners 37, 38. The fasteners 37, 38 fasten to the support bracket 32. The support bracket 32 comprises a plate to which the pipe mounting assembly 40 is mounted. However, alternative arrangements are envisaged.

The pipe mounting assembly 40 comprises the fasteners 37, 38 and a pipe support block 41. The pipe support block 41 acts as a pipe support and is fastened to the support bracket 32 by the fasteners 37, 38. The fasteners 37, 38 extend through the pipe support block 41 and the support bracket 32 to clamp the pipe support block 41 with the support bracket 32.

The fasteners 37, 38 include the first fastener 37 and the second fastener 38. Each fastener 37, 38 includes a bolt 37a, 38a acting as a fastening member, and a nut 37b, 38b acting as a fastening element. The fasteners 37, 38 are threadedly engaged fasteners, although it will be understood that alternative fastening means may be used.

The pipe support block 41 comprises a first part 42 and a second part 43. The first and second parts 42, 43 together form a collar between which the pipe 31 is held in place. Each fastener 37, 38 extends through each of the first part 41 and the second part 42 to mount each part 42, 43 with the support bracket 32. The pipe support block 41 is described below in detail with reference to FIGS. 6 to 9. The pipe 31 is slidably retained by the pipe support block 41.

The first and second parts 42, 43 are brought together into abutment to define a pipe receiving bore 44. The pipe receiving bore 44 is sized to slidably receive the pipe 31. The pipe receiving bore 44 has a diameter substantially corresponding to the diameter of the pipe 31. The pipe receiving bore 44 is configured to hold the pipe 31 when the first and second parts 42, 43 are retained in abutment with each other. The pipe receiving bore 44 is defined by a first bore recess 45 in the first part 42 and a second bore recess 46 in the second part 43. The first and second bore recesses 45, 46 are configured to align when the first and second parts 42, 43 are brought together.

The first and second parts 42, 43 are identical. As such, the first and second parts 42, 43 have corresponding identical mating features. The first and second parts 42, 43 are interchangeable. The first and second parts 42, 43 are similar and so only the first part 42 will be described in detail below.

The pipe support block 41 includes a first fastener hole 50 and a second fastener hole 51. The first and second fastener holes 50, 51 extends through the pipe support block 41. The first fastener hole 50 extends through both the first part 42 and the second part 43. The second fastener hole 51 extends through both the first part 42 and the second part 43. The first fastener hole 50 includes a first hole portion 50a in the first part 42, and a second hole portion 50b in the second part 43. Similarly, the second fastener hole 51 includes a first hole portion 51a in the first part 42 and a second hole portion 51b in the second part 43. When the pipe support block 41 is assembled, the first and second hole portions 50a, 50b of the first fastener hole 50 co-axially align with each other to define the first fastener hole 50. Similarly, the first and second hole portions 51a, 51b align co-axially with each other to form the second fastener hole 51. The first fastener hole 50 is therefore defined by both the first and second parts 42, 43. The second fastener hole 51 is therefore defined by the first and second parts 42, 43.

The first part 42 has a body 47. The bore recess 45 is in the body 47. The first part 42 has a first abutment face 52. The first bore recess 45 is formed in the first abutment face 52. The first abutment face 52 is arranged to abut against a second abutment face 53 of the second part 43. The first and second abutment faces 52, 53 of the first and second parts 42, 43 are brought into contact with each other to form the collar around the pipe 31 as shown in the cross-sectional view of FIG. 7.

The first and second abutment faces 52, 53 of the first and second parts 42, 43 are inclined relative to the axis 44a of the pipe receiving bore 44, as defined by the first and second bore recesses 45, 46. The first and second abutment surfaces 52, 53 extend at an oblique angle to the pipe receiving bore axis 44a. As such, when the first and second parts 42, 43 are brought together in the correct orientation, then the abutment faces 52, 53 are brought into contact with each other. The first and second hole portions 50a, 51a, 50b, 51b of the first and second fastener holes 50, 51 co-axially align with each other so that fasteners may be inserted therethrough.

If one of the first and second parts 42, 43 is incorrectly oriented by 180 degrees then the first and second abutment surfaces 52, 53 will not lie co-planar with each other such that there will be an offset between the first and second hole portions 50a, 1a, 50b, 51b of each of the first and second fastener holes 50, 51. In such an orientation it will be readily apparent that the first and second parts 42, 43 are incorrectly assembled as the fastener will not be able to be inserted through each of the first and second fastener holes 50, 51.

The first part 42 has first and second overlap portions 54, 55. The overlap portions 54, 55 protrude from the body 47. The first and second overlap portions 54, 55 are on opposing sides of the pipe receiving bore 44. The overlap portions 54, 55 have a reduced thickness relative to the body 47. Each overlap portion 54, 55 has a thickness substantially half that of the body 47 in the axial direction. The first hole portion 50a is in the first overlap portion 54. The second hole portion 50b is in the second overlap portion 55. The first fastener hole 50 is formed by corresponding overlap portions 54 of the first and second parts 42, 43. The second fastener hole 51 is formed by corresponding overlap portions 55 of the first and second parts 42, 43. As such, the fastener holes 50, 51 are formed by the overlap portions. The first and second fastener holes 50, 51 are on diametrically opposing sides of the pipe receiving bore 44. The pipe receiving bore 44 is therefore defined between the axes of the first and second fastener holes 50, 51.

Each of the first and second parts 42, 43 have corresponding first and second clamping faces 57, 58. The first and second clamping faces 57, 58 of the first and second parts 42, 43 respectively clamp together. Each overlap portion 54, 55 of the first part 42 defines one of the first clamping faces 57. Each overlap portion 54, 55 of the second part 43 defines one of the second clamping faces 58. The clamping faces 57, 58 of the first and second parts 42, 43 clamp against each other when the first and second parts 42, 43 are brought together in an axial direction of the first and second fastener holes 50, 51. The first and second fastener holes 50, 51 extend to the clamping faces 57, 58.

A stop configuration 60 engages the first and second parts 42, 43. The stop configuration 60 comprises a protrusion 61 acting as a male stop feature and a recess 62 acting as a female stop feature on each of the clamping faces 57, 58. The male stop features 61 are configured to align with the corresponding one of the female stop features 62 when the first and second parts 42, 43 are brought together in an axial direction of the first and second fastener holes 50, 51. The stop 60 is offset from the axis of each of the first and second fastener holes 50, 51.

To assemble the pipe assembly 30, the fluid pipe 31 is received in the opening 35 in the or each support bracket 32 acting as an aircraft structural member. The support brackets 32 are affixed in an aircraft assembly. The pipe support block 41 is arranged on the pipe 31. The first and second parts 42, 43 are brought together to form the collar around the pipe 31 with the pipe 31 received in the pipe receiving bore 44. The pipe 31 is slidably fitted by the collar. The abutment faces 52, 53 of the first and second parts 42, 43 are brought into contact to define the collar. The first and second clamping faces 57, 58 of the first and second parts 42, 43 are brought together in an axial direction. The first and second hole portions 50a, 51a, 50b, 51b align with each other to define the first and second fastener holes 50, 51. When the clamping faces 57, 58 are brought together, the male stop feature 61 locates in the female stop feature 62.

The first and second fastener holes 50, 51 are aligned with the mounting apertures 36 in the support bracket 32. The first fastener 37 is inserted through the first fastener hole 50 and the corresponding mounting aperture 36. Similarly, the second fastener 38 is inserted through the second fastener hole 51 and the corresponding mounting aperture 36. When each of the first and second fasteners 37, 38 are fastened, the pipe support block 41 is clamped against the support bracket 32. The first and second parts 42, 43 are each clamped by each of the first and second fasteners 37, 38 with the support bracket 32. As such, the fastening means for fastening the first and second parts 42, 43 of the pipe support block 41 also fastens the pipe support block 41 to the support bracket 32, acting as a structural member.

The stop configuration 60 prevents rotation of the first and second parts 42, 43 relative to each other should one of the fasteners 50, 51 be omitted. The stop configuration 60 also aids alignment of the first and second parts with each other.

Each of the first and second parts 42, 43 is formed from a polymer, such as nylon. However it will be understood that alternative materials may be used.

With the above described arrangement, it will be understood that clamping of the pipe 31 on a structure is simplified. The number of fasteners used to clamp the pipe in the structure may be minimised whilst maintaining redundancies.

It will be understood that the assembly may be easily disassembled by disengaging the fasteners 37, 38. As such, the pipe support is replaceable or interchangeable.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pipe assembly for an aircraft fluid system comprising:
an aircraft structural member;
a fluid pipe extending through an opening in the aircraft structural member;
a pipe support supporting the fluid pipe, the pipe support comprising:
a first part and a second part which together form a collar with a pipe receiving bore supporting the fluid pipe on the structural member;
a first fastener hole extending through both the first part and the second part;
a second fastener hole extending through both the first part and the second part;
a first fastener extending through the first fastener hole; and
a second fastener extending through the second fastener hole;
wherein the first and second fasteners fasten the first and second parts to each other and to the aircraft structural member,
wherein the first part has a first abutment face and the second part has a second abutment face, the first and second abutment faces being configured to abut to form the collar,
wherein a first bore recess is formed in the first abutment face and a second bore recess is formed in the second abutment face, the first and second bore recesses together forming the pipe receiving bore,
wherein the first and second abutment faces are inclined relative to an axis of the pipe receiving bore,
wherein the first and second abutment surfaces extend at an oblique angle to the axis of the pipe receiving bore,
wherein the oblique angle is an acute angle less than 45 degrees; and
wherein the first part has a pair of opposing first clamping faces, and the second part has a pair of opposing second clamping faces,
each of the first and the second clamping faces includes a stop comprising a male stop feature protruding axially and a female stop feature, wherein the female stop features on first clamping faces of the first part are configured to receive the male stop features on the second clamping faces of the second part when the first and the second parts are brought together in an axial direction of the first and second fastener holes, wherein the stop prevents relative rotation between the first and the second parts about the first or the second fasteners.

2. The pipe assembly of claim 1, wherein axes of the first and second fastener holes extend parallel to an axis of the pipe receiving bore.

3. The pipe assembly of claim 1, wherein the first part has a first abutment face and the second part has a second abutment face, the first and second abutment faces being configured to abut to form the collar.

4. The pipe assembly of claim 3, wherein a first bore recess is formed in the first abutment face and a second bore recess is formed in the second abutment face, the first and second bore recesses together forming the pipe receiving bore.

5. The pipe assembly of claim 1, wherein the first part and the second part each comprise a first overlapping portion which are arranged to overlap to define the first fastener hole; and wherein the first part and the second part each comprise a second overlapping portion which are arranged to overlap to define the second fastener hole.

6. The pipe assembly of claim 1, wherein the first part has a first clamping face, and the second part has a second clamping face, wherein the first and second clamping faces clamp against each other when the first and second parts are brought together in an axial direction of the first and second fastener holes.

7. The pipe assembly of claim 6, wherein the first part has two first clamping faces on one side of the first part, and wherein the second part has two second clamping faces on one side of the second part.

8. The pipe assembly of claim 1, wherein the stop is offset from axes of both the first and second fastener holes to prevent rotation of one of the first and second parts relative to the other of the first and second parts about either of the axes of the first and second fastener holes.

9. The pipe assembly of claim 1, wherein one of the first and second parts is interchangeable with another of the first and second parts, respectively.

10. The pipe assembly of claim 9, wherein the first and second parts are at least substantially identical.

11. The pipe assembly of claim 1, further comprising a first fastener configured to extend through the first fastener hole of the first part and the second part to clamp the first and second parts with each other and the structural member; and a second fastener configured to extend through the second fastener hole of the first part and the second part to clamp the first and second parts with each other and the structural member.

12. The pipe assembly of claim 1, wherein the fluid pipe is slidably retained by the pipe support collar.

13. The pipe assembly of claim 1, wherein the pipe is a hydraulic pipe.

14. The pipe assembly of claim 1, wherein the structural member is one of a rib and a support bracket.

15. A fixed wing aircraft comprising at least one pipe assembly of claim 1.

16. A method of supporting a pipe on a structural member of an aircraft using the pipe assembly for the aircraft fluid system of claim 1.

17. A pipe support for an aircraft fluid system, the pipe support comprising:
a first part and a second part which together form a collar with a pipe receiving bore configured to support a fluid pipe on a structural member;
a first fastener hole extending through both the first part and the second part; and
a second fastener hole extending through both the first part and the second part,
wherein the first and second fastener holes are each arranged to receive a fastener to fasten the first and second parts to each other and to the structural member,
wherein the first and second parts are at least substantially identical,
wherein the first part has mirror symmetry about a plane of symmetry mid-way between the first and second fastener holes,
wherein the second part has mirror symmetry about the plane of symmetry mid-way between the first and second fastener holes; and,
wherein the first part has a pair of opposing first clamping faces, and the second part has a pair of opposing second clamping faces,
each of the first and the second clamping faces includes a stop comprising a male stop feature protruding axially and a female stop feature, wherein the female stop features on first clamping faces of the first part are configured to receive the male stop features on the second clamping faces of the second part when the first and the second parts are brought together in an axial direction of the first and second fastener holes, wherein the stop prevents relative rotation between the first and the second parts about either of the fasteners.

\* \* \* \* \*